(12) United States Patent
Chen et al.

(10) Patent No.: US 10,572,023 B2
(45) Date of Patent: Feb. 25, 2020

(54) PROJECTION-BASED USER INTERFACE

(71) Applicant: INTEL CORPORATION, Santa Clara, CA (US)

(72) Inventors: Fan Chen, Portland, OR (US); Kedar A. Dongre, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 15/279,954

(22) Filed: Sep. 29, 2016

(65) Prior Publication Data

US 2018/0088674 A1    Mar. 29, 2018

(51) Int. Cl.
*G06F 3/01*    (2006.01)
*G06F 3/03*    (2006.01)

(52) U.S. Cl.
CPC .......... *G06F 3/017* (2013.01); *G06F 3/0304* (2013.01)

(58) Field of Classification Search
None
See application file for complete search history.

(56) References Cited

U.S. PATENT DOCUMENTS

| | | | |
|---|---|---|---|
| 6,512,838 B1 * | 1/2003 | Rafii | G01C 3/08 348/E3.018 |
| 6,803,906 B1 | 10/2004 | Morrison et al. | |
| 2003/0132950 A1 | 7/2003 | Surucu et al. | |
| 2010/0231522 A1 * | 9/2010 | Li | G06F 3/0423 345/169 |
| 2013/0057515 A1 * | 3/2013 | Wilson | G06F 3/0425 345/175 |
| 2013/0307949 A1 | 11/2013 | Zhang et al. | |
| 2015/0199101 A1 * | 7/2015 | Hwang | G06F 3/0488 715/862 |
| 2015/0253864 A1 * | 9/2015 | Parkhomenko | G06F 3/017 345/156 |
| 2016/0299569 A1 | 10/2016 | Fisher et al. | |
| 2016/0378251 A1 * | 12/2016 | Aznoe | G06F 3/04812 345/158 |

* cited by examiner

*Primary Examiner* — Amr A Awad
*Assistant Examiner* — Andre L Matthews
(74) *Attorney, Agent, or Firm* — International IP Law Group, P.L.L.C.

(57) ABSTRACT

Techniques for providing a virtual touch screen are described. An example of a computing device with a virtual touch screen includes a projector to project a user interface image onto a touch surface, and a depth camera to generate a depth image representing objects in a vicinity of the user interface image, and a touch mask generator. The computing device also includes a touch detection module to analyze the touch mask to detect touch events. The touch detection module is configured to identify a finger in the touch mask, identify a centroid region of the finger and compute a distance of the centroid region from a touch surface, and compare the distance to a threshold distance to identify a touch event.

17 Claims, 11 Drawing Sheets

500

PROJECTION-BASED USER INTERFACE

TECHNICAL FIELD

This disclosure relates generally to techniques for providing a projection-based user interface. The projection-based user interface enables a user to interact with a projected image using a depth camera as a touch sensor.

BACKGROUND

Traditional computing devices rely on physical instrumentation such as a mouse, keyboard, or touch screen to receive user input. A projection-based user interface enables the user to interact with a virtual input device projected onto a surface. For example, a virtual keyboard can be projected onto a tabletop surface and the user can select keys on the virtual keyboard by touching the surface over which the virtual keyboard is being projected. To detect user inputs, a depth sensor can be used to determine the position of a user's fingers relative to the projected display. Receiving user inputs in this way provides a more flexible input mechanism that does not require any surface instrumentation.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
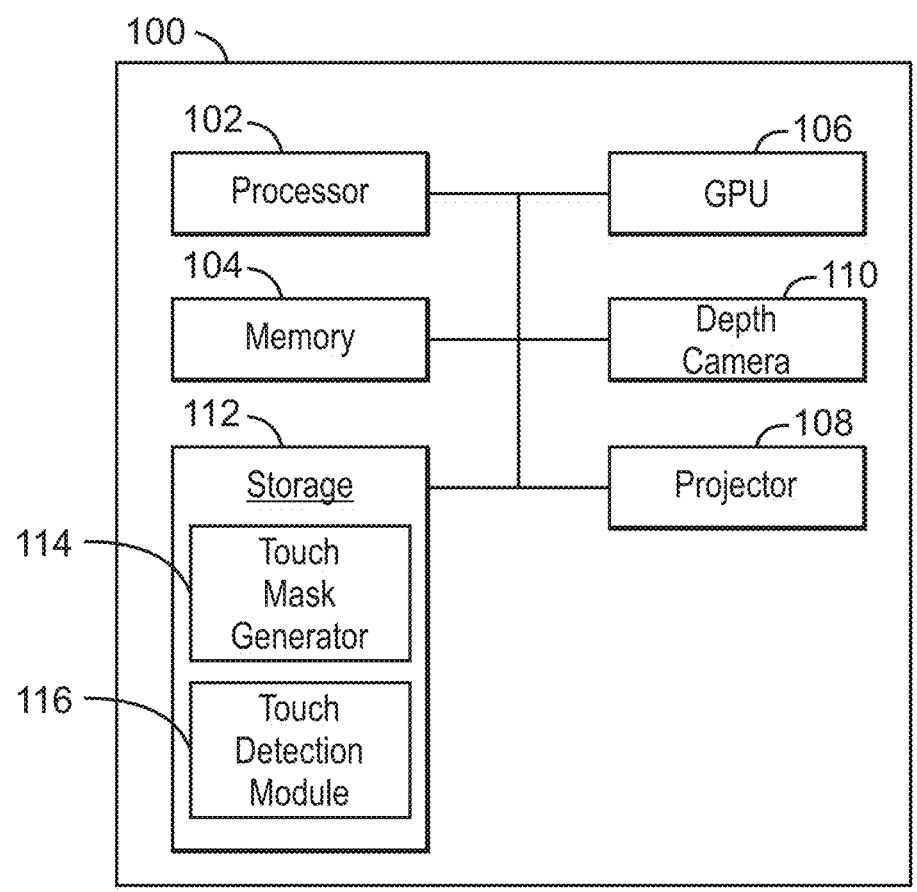
FIG. 1 is a block diagram of an example computing device with a projection-based user interface.

The subject matter disclosed herein relates to techniques for implementing a projection-based user interface referred to herein as a virtual touch screen device. An example system for providing the projection-based user interface includes a projector and a depth camera. The projector displays the user interface on a surface such as a table top and the depth camera detects the position of the user's hands and fingers. The surface on which the display is projected is referred to herein as the touching surface. To enable the system to detect touch events, the projection display space is calibrated to the depth camera space to provide a mapping between the projection display coordinates and the depth camera image coordinates. This mapping enables the system to convert the detected touch location to a corresponding projection display location.

To identify touch events, the depth camera coordinates are analyzed to determine how close a user's finger or fingers are from the touching surface. However, the depth camera data may be subject to various sources of noise, including global variations and local variations. Changes in the depth camera data due to noise can change the detected shape, angle, and distance of the user's fingers and the touch surface.

Global variations refer to noise sources that cause an overall shifting or rotation of the touch surface. One type of global variation is caused camera heating, which can cause a gradual shifting of the depth measurement readings. In some instances, the depth camera may have internal control circuitry designed to correct for thermal drift. However, depending on how the control circuitry is implemented, the depth camera values may periodically suffer from abrupt global changes.

Local variations refer to noise sources that effect individual pixels or small numbers of pixels. Types of local variation include the pixel-wise fluctuation of depth values due to sensor noise, projection surface characteristics, and inaccurate lens dewarping.

The virtual touch screen device described herein may use a technique to continuously identify the touch surface from the noisy depth data sequence, by using a two-pass method to model both global and local variations of the depth data within the touching surface. The first pass captures the global trend of the touch surface with plane-fitting, and the second pass then models the local noise level on the residual depth map after cancelling the global trend. This two-pass surface modelling provides enough resolution for handling local surface characteristics as well as rapid responsiveness against abrupt global surface changes. The result is a uniform touch mask, which facilitates the detection of touch events. In some examples, the resulting touch mask is a normalized depth map with values as distance starting from the touching surface.

The touch mask is then analyzed to detect touch events. However, depth sensing cameras tend to suffer from inaccuracies. For example, when an finger or any other object is very close to surface (approx. 7 mm-10 mm), there is very little difference between the distortion pattern of the surface and the finger. This difficulty in distinguishing the finger from the surface results in touch events being triggered when a non-finger object is placed on the surface or when the finger is approximately 1 centimeter from the surface. Furthermore, the depth sensor will have a certain margin of error. Minor variations in the depth data between successive frames cause the fingertip location to change from one frame to another. When the camera location is mapped to a display location, these minor variations in the fingertip location cause touch jitter, which may prevent detection of user interaction gestures such as long press and double taps.

The virtual touch screen device described herein includes a technique that robustly identifies fingertips and accurately detects touch with a precision of less than 5 mm from the surface. As described further below, touch events are detected by identifying fingers that are within a threshold distance from the touching surface. The accuracy of touch detection is improved by adapting this threshold based on finger posture and inclination. Furthermore, jitter is reduced by analyzing the movement of the entire distal phalanx region of the finger to track finger movements from frame to frame. The distal phalanx region of the finger is the area from the fingertip to the first knuckle joint. This enables multi-touch inputs on an interactive planar surfaces using projection based displays and a depth camera as a touch sensor.

FIG. 1 is a block diagram of an example computing device with a projection-based user interface. The computing device 100 may be, for example, a smart phone, laptop computer, ultrabook, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store data and computer-readable instructions that, when executed by the processor, direct the processor to perform various operations in accordance with embodiments described herein.

The computing device 100 may also include a graphics processor 106 that processes computer generated graphics. The graphics processor 106 is configured to process memory related to the generation of graphics to be sent to a projector 108. The projector 108 may be configured to project the image onto a surface such as a tabletop, a projection screen, a wall, and others.

The computing device 100 also includes a depth camera 110 configured to monitor the image projected onto the surface by the projector 108. The depth camera 110 may be configured to capture color images and depth data. For example, the depth data may be a depth for each pixel in the color image captured by the depth camera 110. The depth camera 110 may be an infra-red depth camera that computes depth based on the distortion of a projected pattern of infra-red light, as observed from the depth camera 110.

The computing device 100 may also include a storage device 112. The storage device 112 may be a non-transitory, computer-readable medium that stores code that can be accessed by the processor 102. For example, the computer-readable storage device 112 can be non-volatile data storage device such as a hard drive, an optical drive, a flash drive, an array of drives, or any combinations thereof. The storage device 112 can also be a logic unit, such as an Application Specific Integrated Circuit (ASIC), a Field Programmable Gate Array (FPGA), for example.

The storage device 112 can store any number of software programs for operating the computing device 100, including an operating system (OS), user software applications, device drivers, and others. Among other components, the storage device can include a touch mask generator 114 and a touch detection module 116.

The touch mask generator 114 uses a two-pass process for modeling global variations and local variations of the touch surface as measured by the depth data received from the depth camera. Global variations may be modeled by removing outliers from the depth data received from the camera and performing a two-dimensional linear regression on the outlier-removed depth data in the central area of the depth image. The result of the two-dimensional regression is the principle plane of the touch surface. Next, residual depth values are computed by subtracting the principle plane from the raw depth values received from the depth camera. The residual depth values form a residual depth map. Subtracting the principle plane from the raw depth values normalizes the raw depth values received from the camera into distances to the principle plane. This process may be repeated for each frame of data received from the depth camera. In this way, global variations that change the principle plane will be cancelled in the residual depth values of the residual depth map.

Local variations may be modeled by continuously updating a Gaussian distribution at each pixel of the residual depth map. The average depth values from these Gaussian components form a plane that represents the touching surface in the residual data space. This average plane is subtracted from the residual depth values, which normalizes the residual depth values to the distance to an ideal flat surface plane. This compensates the local differences at each pixel position. The touch mask generator 114 then generates the touch mask by collecting all normalized residual depth values that are further away from the touch surface than a threshold (e.g., two times the standard deviation of the noise level at the corresponding pixel position). The resulting touch mask is a depth value map in which the touch surface has been normalized to zero, and other objects have been normalized to a depth value indicating the distance of the object from the touch surface. The two-pass process to generate the touch mask is described further in relation to FIGS. 2 and 3A-J.

The touch detection module 116, analyzes the touch mask generated by the touch mask generator 114 to detect touch events. For each depth image, the touch detection module 116 identifies those pixels in the depth image that correspond to hands and other objects on or above the projection surface. Hand detection may be accomplished through the use of hierarchical multi-pass histograms. For each detected object, the histogram of the object's contour (connected set of pixels) is evaluated against a model of depth distribution for a typical hand resting on the surface. This enables the touch detection module 116 to eliminate non-hand objects. For each identified hand contour the touch detection module 116 estimates the finger's angle of inclination to the surface by analyzing the histogram of the distal phalanx region of the finger. The touch detection module 116 also estimates the distance of the first knuckle joint of the finger from the surface by using the histogram of the centroid region of the distal phalanx area.

The touch detection module 116 identifies touch events using the estimated the finger posture and the estimated distance between the touch surface and the centroid of the distal phalanx region of the finger. To identify touch events, the distance between the fingertip centroid and the touch surface is compared to a threshold distance. A touch event is detected if the distance between the fingertip centroid and the touch surface is less than the threshold distance. The threshold distance is adjusted depending on the finger posture. In some examples, a touch event is detected if the distance of the fingertip centroid to be very close to the surface, for example, less than 3 millimeters for a flat finger posture, i.e., nearly parallel to table. The threshold distance may be progressively increased as the finger inclination increases.

To further improve the accuracy of touch detection, the touch detection module 116 may stabilize the touch point location and thereby reduce jitter by determining the distance in pixels by which the fingertip centroid has moved from the previous frame. For very minor movements (e.g., less than 3 pixels) the touch detection module 116 reuses previous fingertip location for touch detection. For larger movements (e.g., greater than 6 pixels) the midpoint of the previous fingertip location and the current fingertip location is computed and used for touch detection. The process for detecting touch events is described further in relation to FIGS. 4 and 5A-F.

The detected touch events may be injected into the operating system. In some examples, the touch events are injected into the operating system through a user Interface device driver that complies with the Universal Serial Bus-Human Interface Device (USB-HID) class specification.

The block diagram of FIG. 1 is not intended to indicate that the computing device 100 is to include all of the components shown in FIG. 1. Rather, the computing system 100 can include fewer or additional components not shown in FIG. 1, depending on the details of the specific implementation. For example, the computing device 100 may also include a network interface controller (NIC) configured to connect the computing device 100 to a network 116 and/or a memory controller hub that handles communications between the processor 102, memory 104, graphics processor 106, and other components. Additionally, the computing device 100 may include or be coupled to additional user interface devices, such as keyboard, a mouse, Input/Output (I/O) devices, displays, and others. Furthermore, any of the functionalities of the CPU 102, the graphics processor 106 may be partially, or entirely, implemented in hardware and/or in a processor. For example, the functionality may be implemented in any combination of Application Specific Integrated Circuit (ASICs), Field Programmable Gate Array (FPGAs), logic circuits, and the like.

Figure 2:
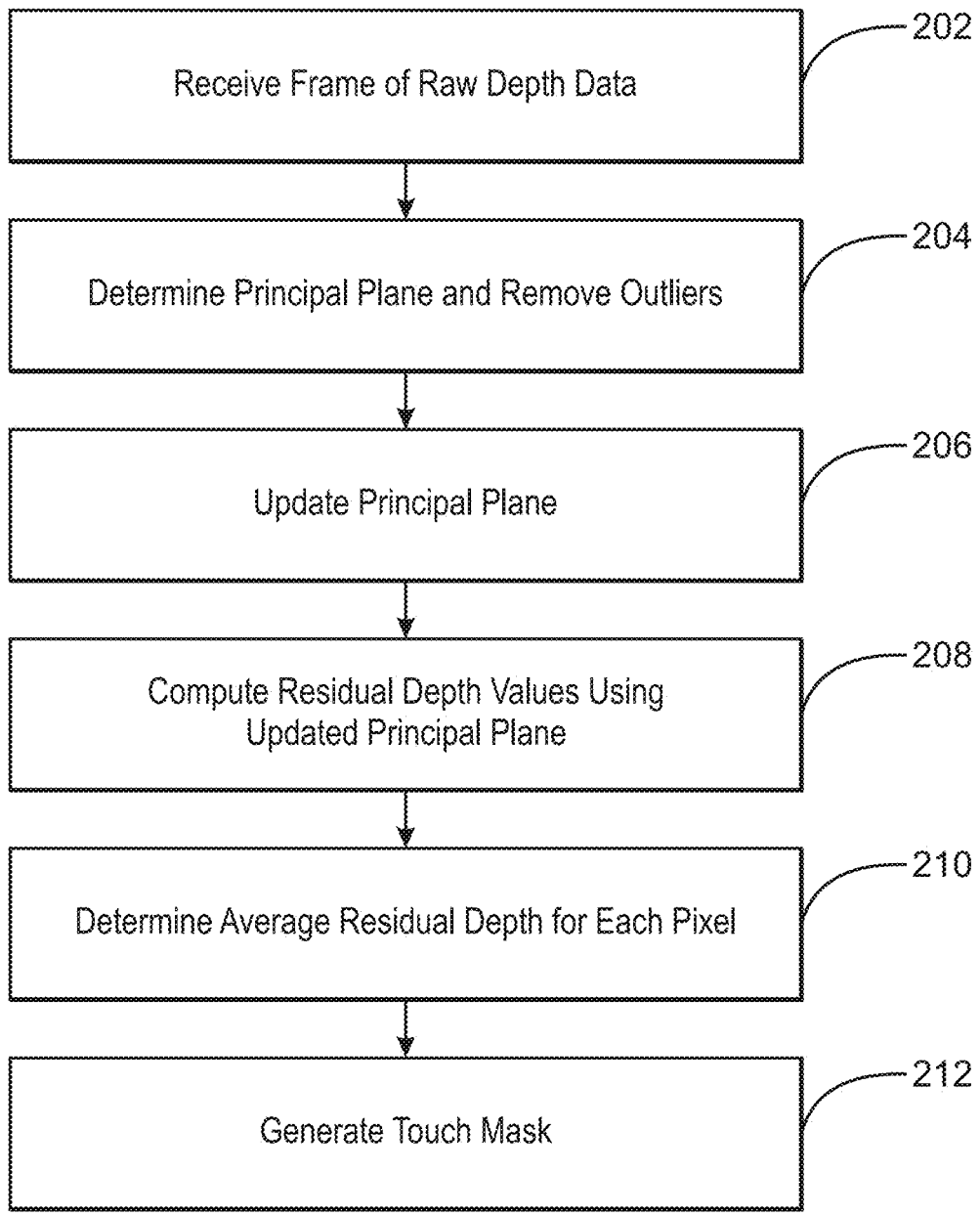
FIG. 2 is a process flow diagram of an example method of generating a touch mask.

FIG. 2 is a process flow diagram of an example method of generating a touch mask. The method 200 may be practiced by the touch mask generator 114 of FIG. 1. Features of the method 200 are also illustrated with reference to FIGS. 3A-J. The method may begin at block 302.

Figure 3B:
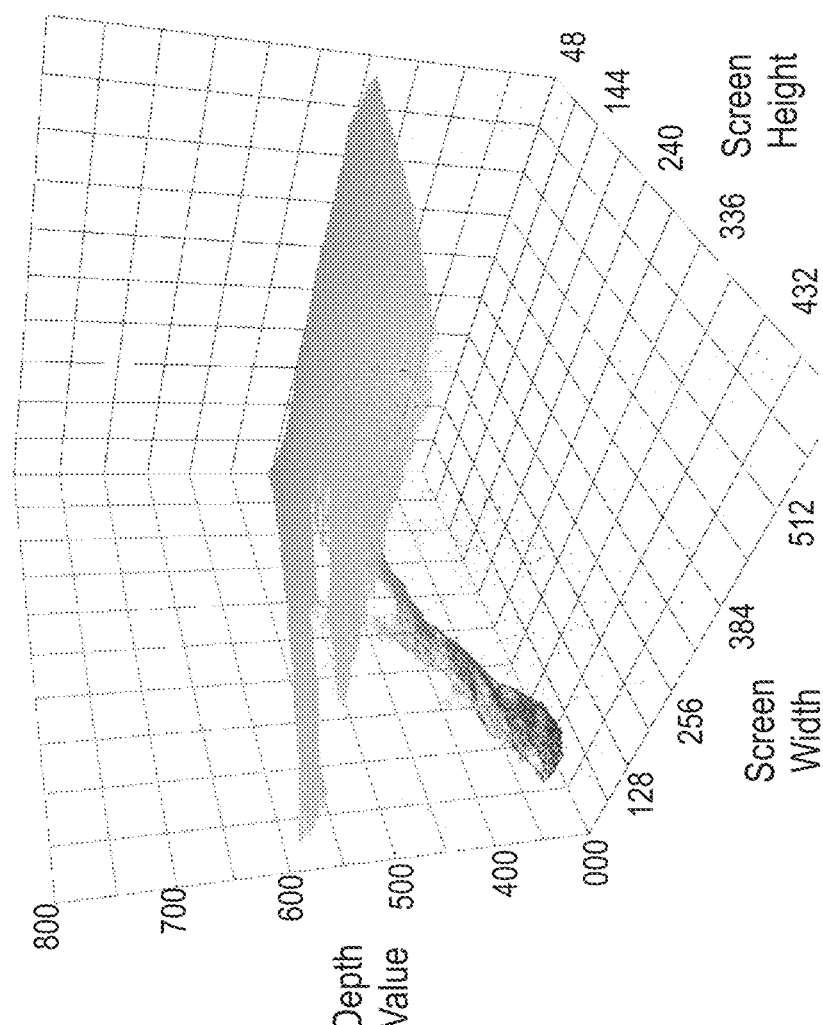
FIGS. 3A-J are example illustrations of a method of generating a touch mask.
Figure 3A:
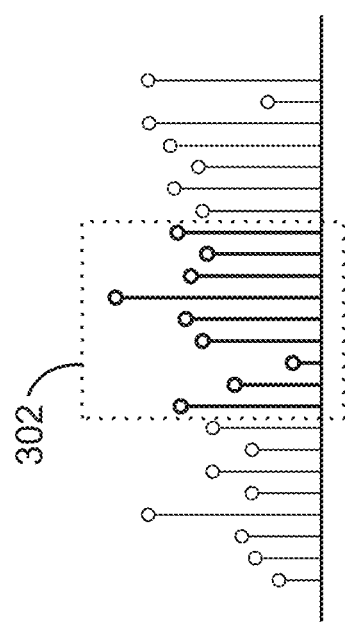

At block 202, a frame of raw depth data is received from the depth camera. An illustration of the raw depth data is shown in FIGS. 3A and 3B. This frame of depth data is referred to as frame t (frame at time t). FIG. 3A shows a two-dimensional representation of a portion of the depth image frame. In FIG. 3A, each circle represents a different pixel, with the height of the circle representing the depth value at that pixel, wherein the depth value represents the distance from the depth camera to the object. FIG. 3B shows a three dimensional plot of the raw depth data.

At block 204, the principal plane is identified and outliers are removed. The principal plane is identified by identifying the best plane that can fit the central area of the depth map. For example, in FIG. 3A a central portion of the depth frame is identified by the dashed box 302. The pixels within the dashed box are further processed to remove the outliers.

Figure 3C:
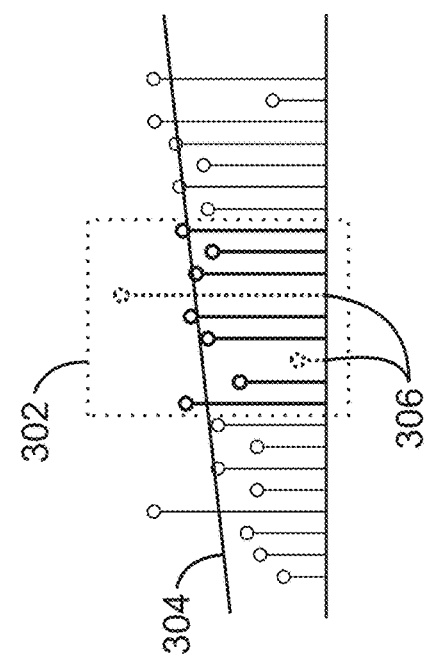

The outliers may be removed by comparing the raw depth data with the previous principal plane computed in the previous iteration of the method 200, i.e., frame t-1. The previous principal plane is represented by Equation 1. In Equation 1, $x=\{u, v, 1\}$, where u and v represent the two dimensional coordinates of a pixel in the depth image, $W^{t-1}$ is the parameter of the principle plane in the 3D physical space, and v is the corresponding depth value of x computed on the principle plane. In FIG. 3C, the previous principal plane is shown as item 304.

$$y = W^{t-1}x \qquad \text{Eq. 1}$$

The set of inliers may be determined according to the Equation 2.

$$\Phi = \{i \mid |d_i^t - W^{t-1}x_i^t| < \theta_1\} \qquad \text{Eq. 2}$$

Figure 3D:
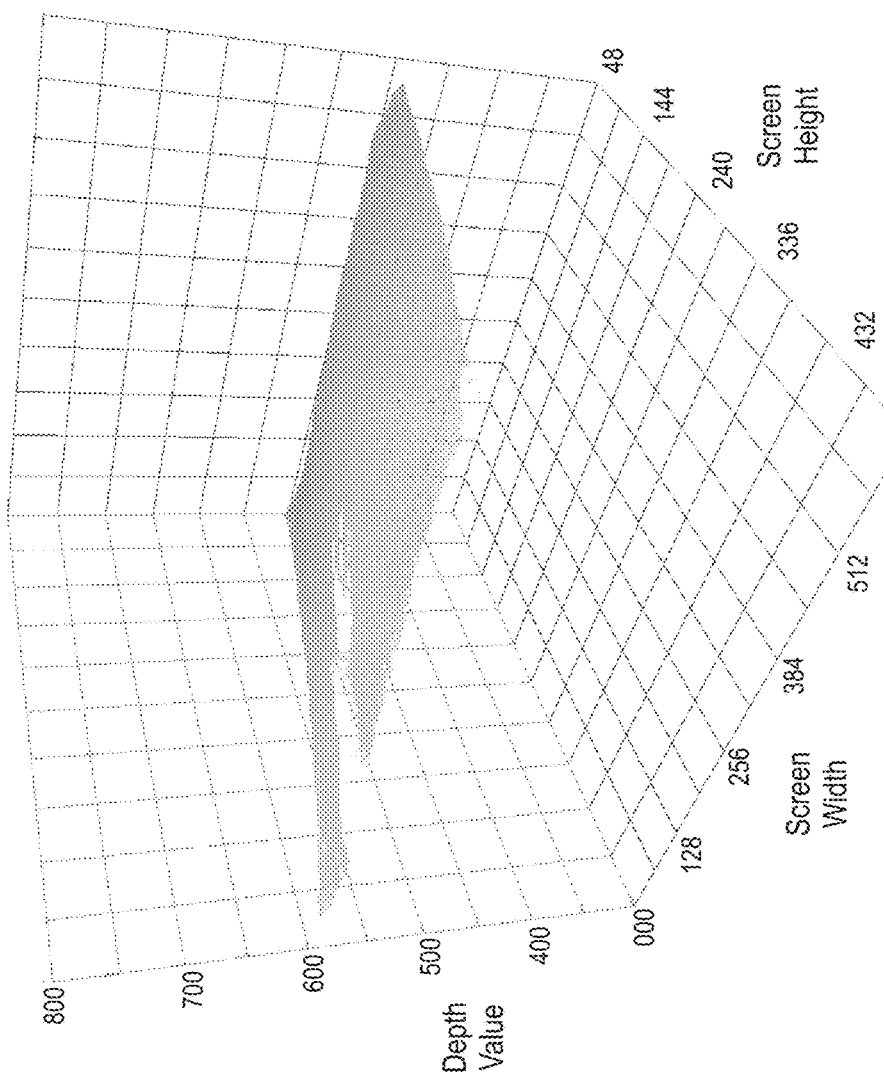

In the above equation, $\Phi$ represents the set of inliers, $d_i^t$ represents the depth value of the i-th pixel in frame t, and $x_i^t = \{u_i^t, v_i^t, 1\}$, where $u_i^t$ and $v_i^t$ represent the two dimensional coordinates of the i-th pixel in frame t. An example result of this computation is shown in FIG. 3C. In the example of FIG. 3C, two outliers 306 have been identified an excluded from the set of inliers. FIG. 3D shows a three dimensional plot of the raw depth data with outliers removed.

At block 306, the principal plane is updated. To update the principal plane, all inliers are used to compute the principle plane, which is achieved by performing a linear regression over the raw depth data with outliers removed. The linear regression may be performed by solving the minimum least square error according to Equation 3.

$$W^t = \operatorname{argmax} \Sigma_{i \in \Phi} |d_i^t - W^t x_i^t|^2 \qquad \text{Eq. 3}$$

Figure 3F:
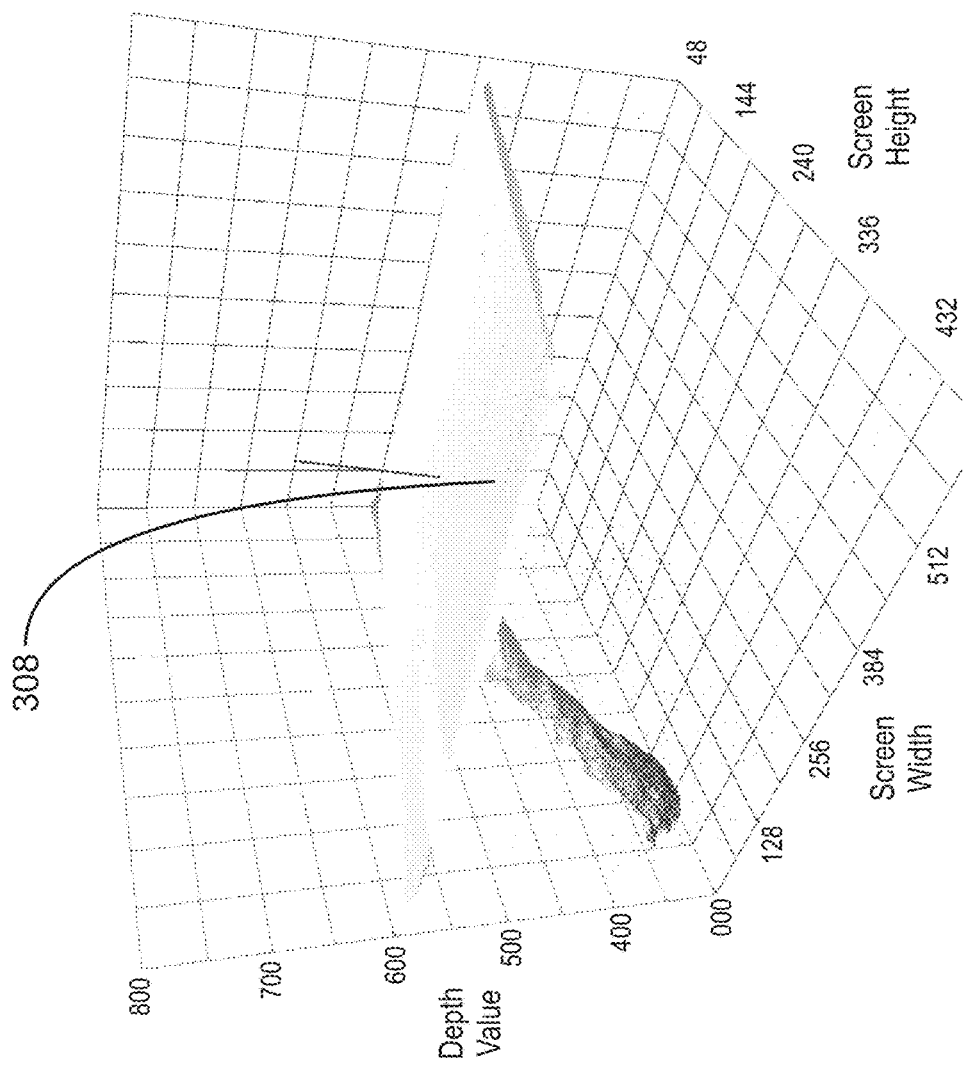
Figure 3E:
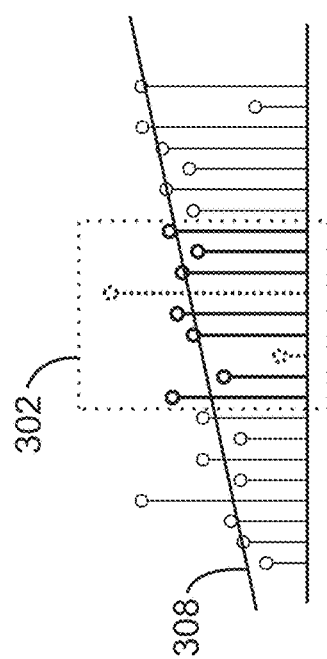

The updated principal plane is shown in FIGS. 3E and 3F as item 308.

Figure 3H:
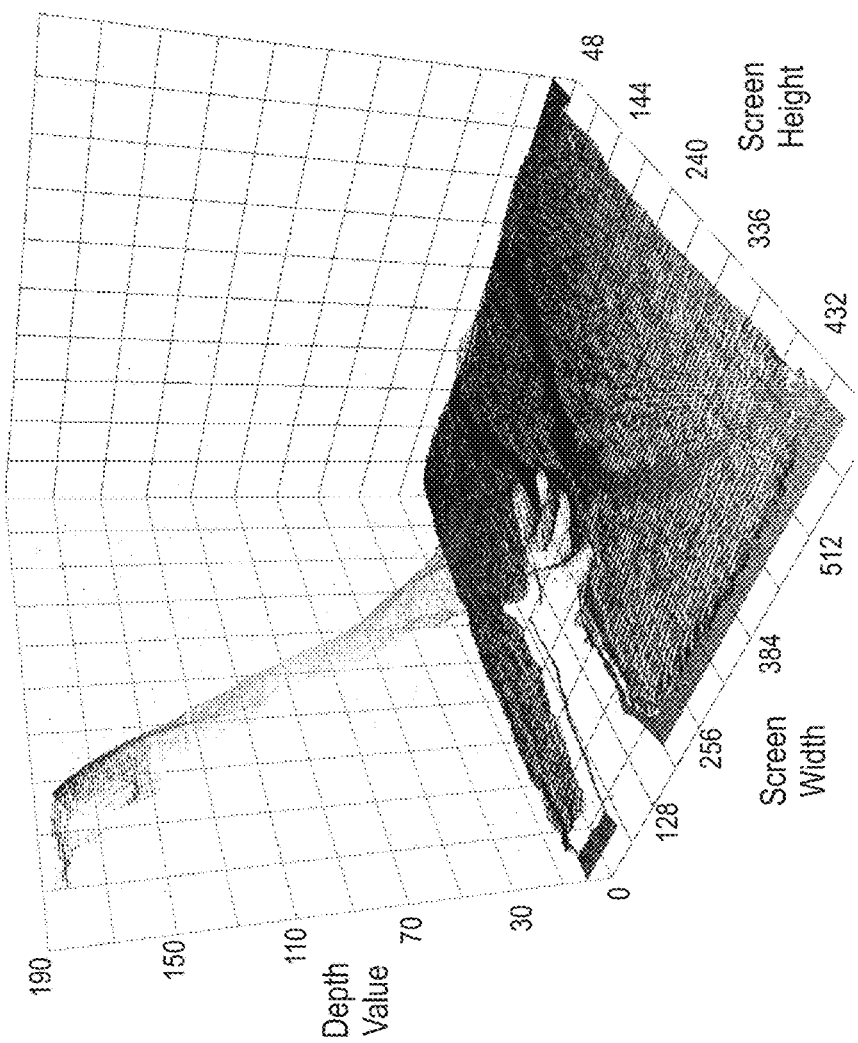
Figure 3G:
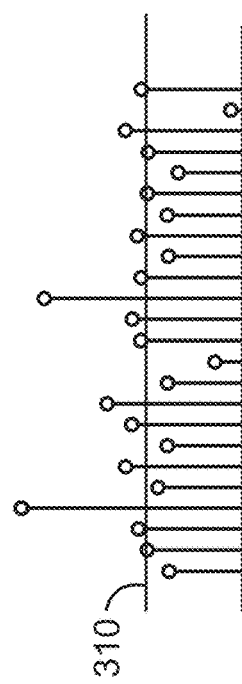

At block 208, residual depth values are computed using the updated principal plane. The residual depth values are computed by subtracting the principle plane from each of the original depth values of the raw depth data. This results in a residual depth map in which global variations are cancelled and the touch mask maintains stability against global drifting and surface rotation. A two-dimensional representation of the residual depth map is shown in FIG. 3G, and a three-dimensional plot of the residual depth map is shown in FIG. 3H. In FIG. 3G, the line 310 represents the average depth value. Next, at block 210 and 212 the local variations of the depth data are modeled.

Figure 3J:
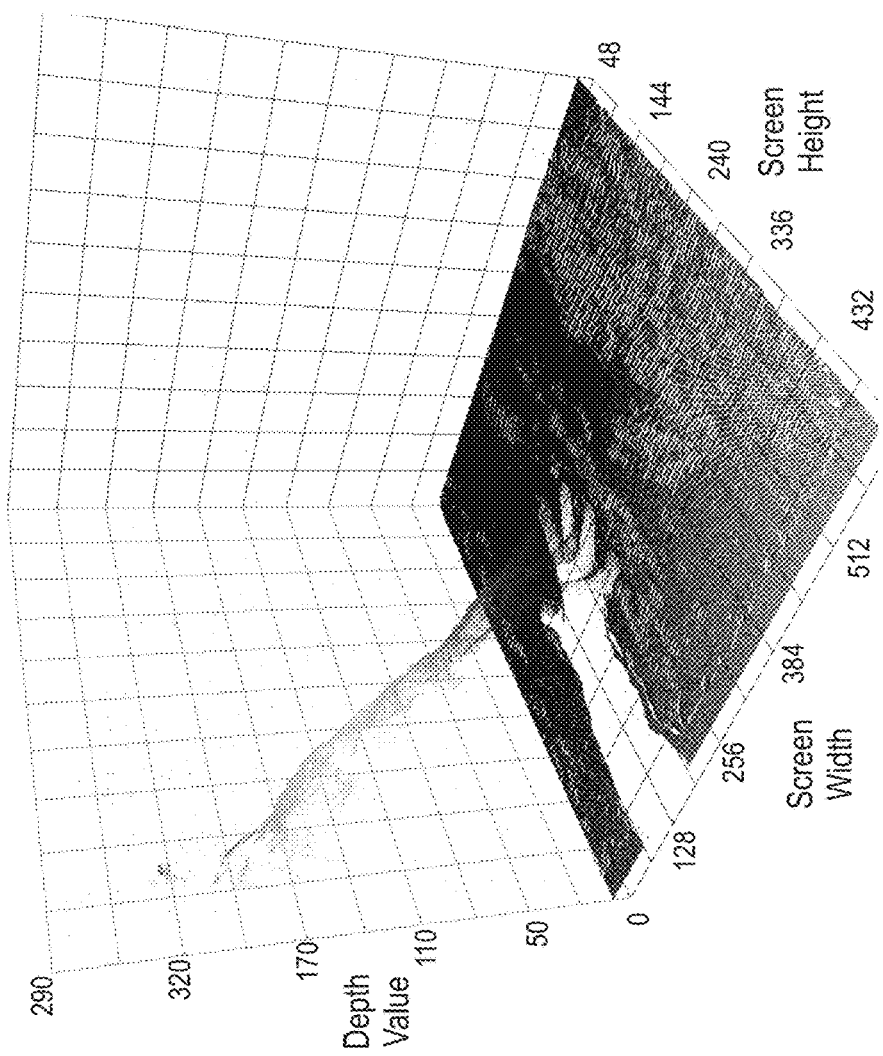
Figure 3I:
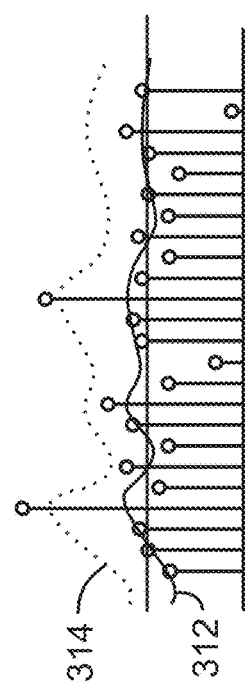

At block 210, the average residual depth is determined for each pixel. To determine the average residual depth, the average and standard deviation of local fluctuations in the depth value at each pixel is continuously updated for each successive frame of raw depth data. The average and standard deviation of local fluctuations may be computed using a Gaussian component at each pixel. The Gaussian modeling of the average and standard deviation of local fluctuations is illustrated in FIG. 3I. In FIG. 3I, line 312 represents the average touch surface taking into account the depth value fluctuations at each pixel, and line 314 represents the two-sigma standard deviation.

At block 212, the touch mask is generated using the average and standard deviations generated above. To generate the touch mask, the residual depth values are normalized by subtracting, at each pixel, the average depth computed for the pixel from the residual depth value for that pixel, as shown in Eq. 4.

$$d_i^* = d_i^t - W^t x_i^t - u_i \qquad \text{Eq. 4}$$

In Equation 4, $d_i^t$ represents the observed depth value of the i-th pixel in frame t, $W^t x_i^t$ represents the corresponding depth value of the i-th pixel in the principle plane, and $u_i$ represents the average depth value computed for the i-th pixel.

Generating the touch mask filter may also include filtering out all depth values with a standard deviation smaller than two sigma of the local variations. This filtering eliminates any depth value that is above the touch surface due to noise, and reduces the possibility that depth value fluctuations due to noise will be registered as touch events. The resulting touch mask is a depth value map in which the touch surface has been normalized to zero, and other objects have been normalized to a depth value indicating the distance of the object from the touch surface. The touch mask resulting from the method 200 is shown in FIG. 3J.

The method 200 should not be interpreted as meaning that the blocks are necessarily performed in the order shown. Furthermore, fewer or greater actions can be included in the method 200 depending on the design considerations of a particular implementation.

FIGS. 3A-J are example illustrations of a method of generating a touch mask. FIGS. 3A-J are described further above in relation to FIG. 2.

Figure 4:
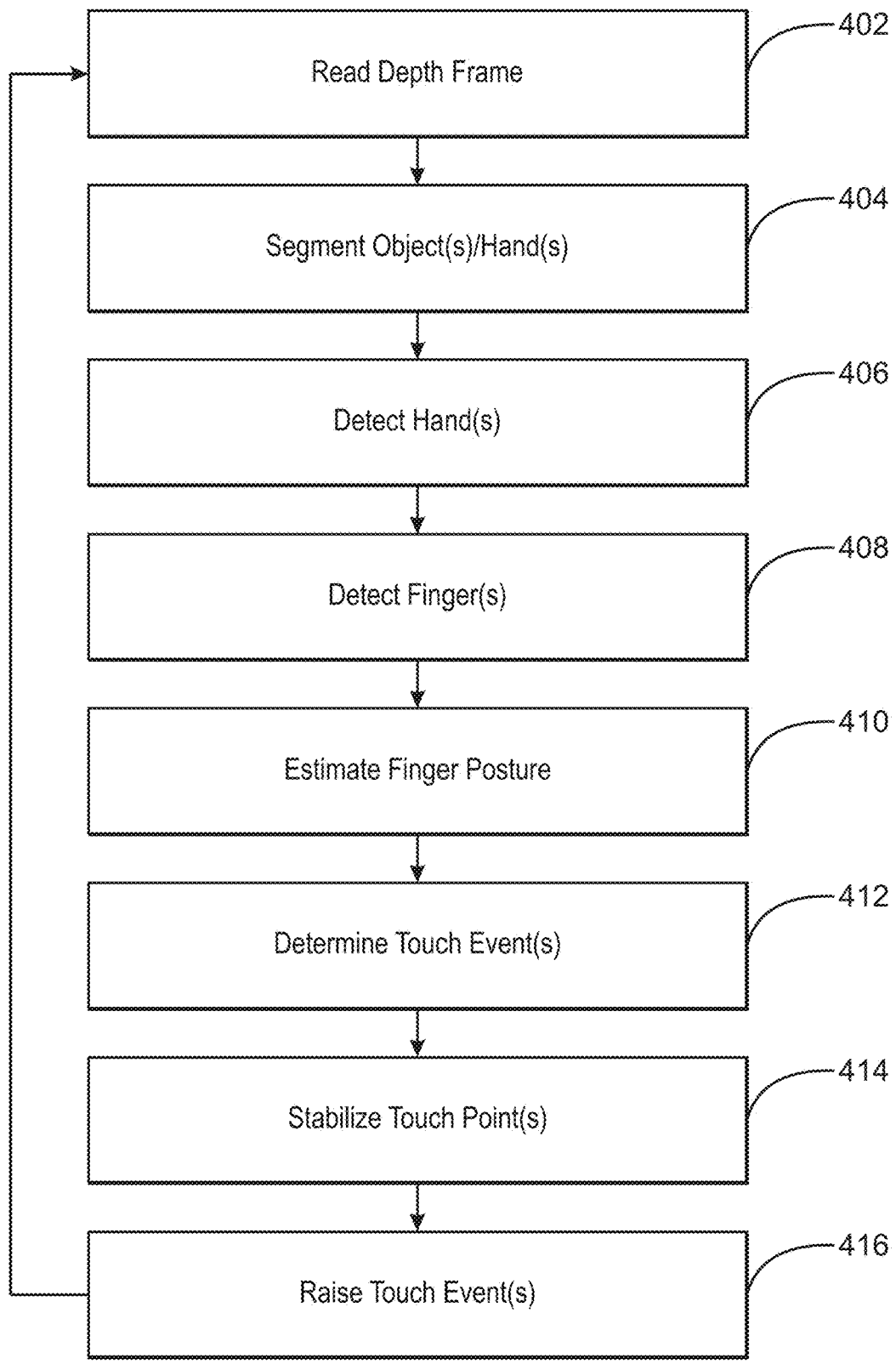
FIG. 4 is a process flow diagram of an example method of detecting touch events.

FIG. 4 is a process flow diagram of an example method of detecting touch events. The method 400 may be performed by the touch detection module 116 of FIG. 1 using the touch mask generated by the touch mask generator 114. Features of the method 400 are also illustrated with reference to FIGS. 5A-F. The method 400 may begin at block 402.

At block 402, the current depth image frame is read. The depth image frame is used to generate a touch mask. In some examples, the touch mask is the touch mask generated by the touch mask generator 114. However, other techniques for obtaining the touch mask are possible, including the random sample consensus (RANSAC) technique and others. Therefore the touch detection techniques described herein are applicable to other techniques for obtaining the touch mask.

Figure 5A:
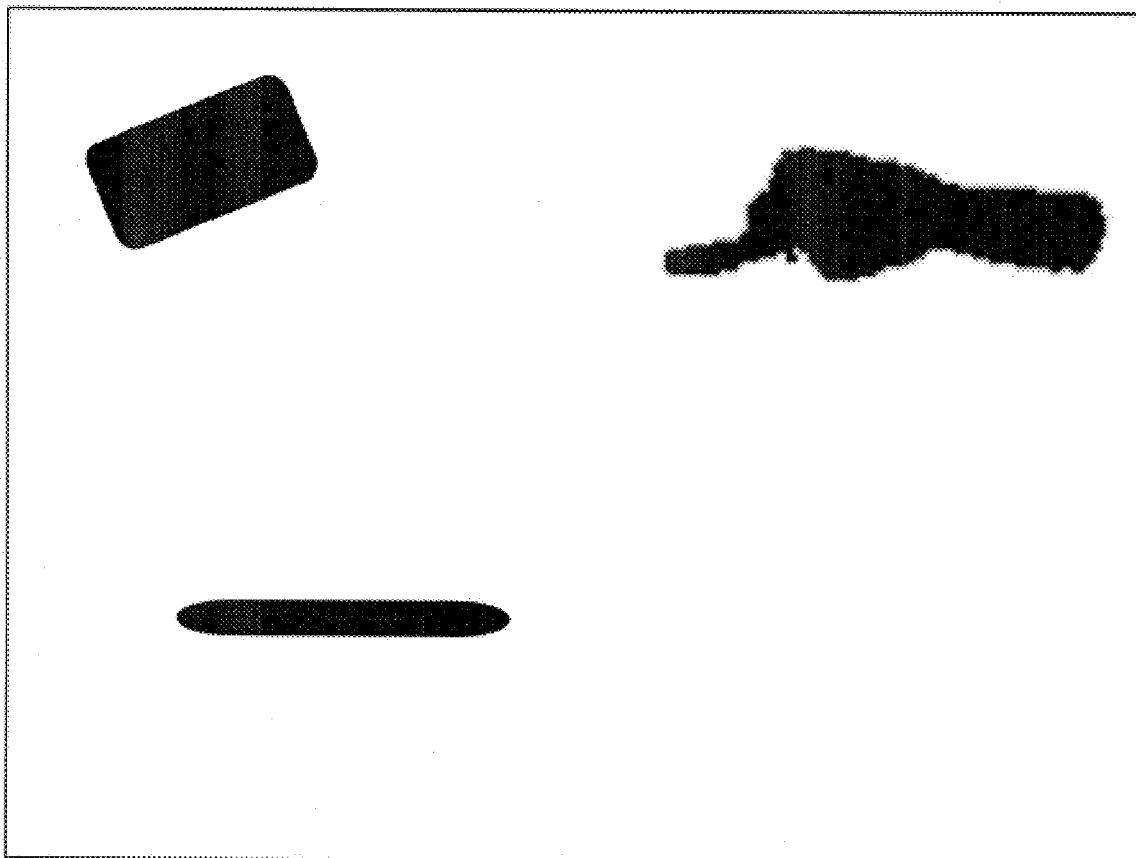
FIGS. 5A-F are example illustrations of a method of detecting touch events.

At block 404, the touch mask is analyzed to segment hands and other objects from the touch surface. To segment hands and other objects from the touch surface, a binary mask is generated from the touch mask. In the binary mask, the surface pixels are represented by one value (e.g. '0') and the non-surface pixels are set to another value (e.g. '1'). FIG. 5A shows an example of a binary touch mask 500 that may be generated from the depth image frame. In FIG. 5A, surface pixels are white and non-surface pixels are black.

Figure 5B:
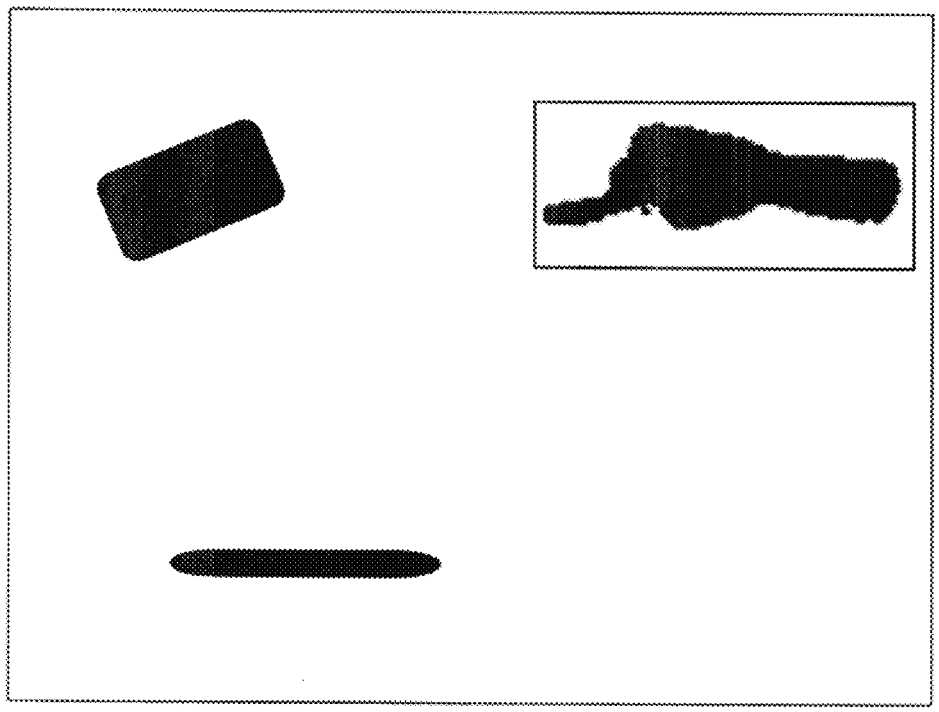
Figure 5C:
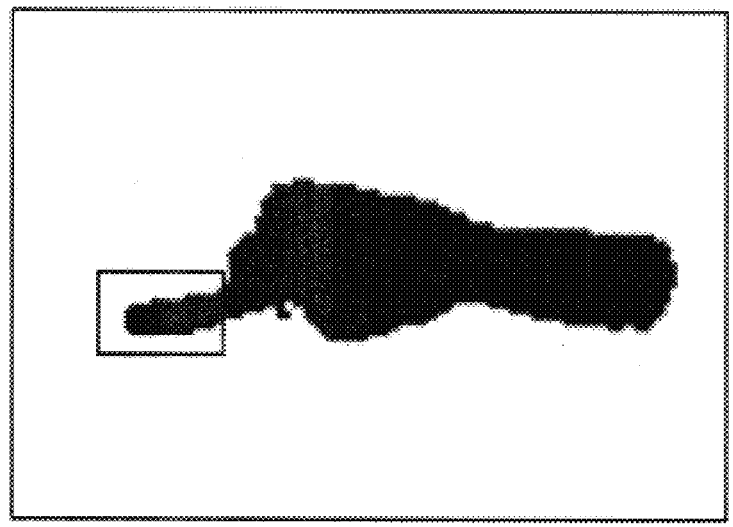

At block 406, hands are detected within the binary mask. To detect hands, the contours on the binary mask are identified and the corresponding pixels in the depth image data belonging to the same object are grouped. Each object is then analyzed to determine if it corresponds with a hand. This may be done by computing the histogram of touch mask depth values within the contour region. The histogram of depth values represents the distribution of depth values for pixels within the contour. This distribution is then evaluated against a predetermined depth model for a typical hand object. Various depth model factors may be used to determine whether the histogram is likely to represent a hand. For example, for a hand very near to the surface, a portion of pixels corresponding to the finger region should be at a distance of about 20 millimeters from the surface and a larger portion of pixels corresponding to the palm, wrist, arm, etc. should be at distance of more than 30 millimeters from the surface. This process eliminates a majority of non-hand objects, including planar objects such as phones, small objects such as pens and keys, large objects such as cups, etc. FIG. 5B shows the binary mask with a box surrounding an object that has been identified as a hand.

At block 408, fingers are detected. To detect fingers, the pixels within the contour of the hand are analyzed to identify fingers and/or fingertip location. The shape of hand contour is analyzed to locate the extremities with the sharpest angles to identify potential fingertip points. For each identified potential fingertip point, a region of the finger is marked. The marked region of the finger may be the entire finger or a portion of the finger, such as the distal phalanx region. Each of these marked finger regions are further analyzed to determine if they correspond to a valid fingertip. For example, geometric features of the region can be computed such as the height, width, and area of the region and its bounding rectangle. These features may be compared against a model of a typical fingertip. For example, the region to be identified as a valid fingertip if the width of the regions is smaller than a specified threshold, for example, less than 200 pixels. After any fingers are located, other portions of the hand or arm can be eliminated from further analysis. The below picture shows the potential fingertip locations identified in the binary mark and the corresponding fingertip region/bounding box in the depth map. FIG. 5B shows the binary mask with a box surrounding an object that has been identified as a finger.

At block 410, finger posture is determined for each detected finger. The finger posture may be represented by the finger inclination and the centroid region of the finger. In some embodiments, finger posture may be estimated by building a model from the depth image data regarding how the finger is approaching and/or landing on the touch surface. From the model, finger inclination is estimated and the distance of distal phalanx centroid from surface is estimated. This may be done by computing the histograms of depth values of pixels within the entire distal phalanx region and in the centroid region. The distribution of depth values within the entire region is analyzed to estimate the finger inclination. For example, if the finger is relatively flat, the majority of pixels may be a small distance from the surface, for example less than 9 millimeters. If the finger has normal inclination, the majority of pixels may be a larger distance from the surface, for example, less than 18 millimeters. If the finger is at a steep inclination, the majority of the pixels will be an even greater distance from the surface, for example, greater than 25 millimeters.

In some embodiments, finger posture may be estimated by estimating the principle orientation of the finger in three-dimensional space. First, the in-plane XY direction of the fingertip is determined, which may be achieved by performing Principle Component Analysis (PCA) on the touch mask according to Equation 5. In Equation 5, $x_i$ is the 2D coordinate position of the i-th pixel in the fingertip image patch centered at the fingertip, $z_i$ is its corresponding value in the depth mask, $v^t$ defines an axis in the 2D depth image, which projects $x_i$ into a line, and $v^{XY}$ is the principle axis that has the maximum projected variance, which corresponds to the finger direction.

$$v^{XY} = \underset{|v|=1}{\operatorname{argmax}} \sum_{i, z_i > 0} (v^T x_i)^2. \qquad \text{Eq. 5}$$

Next, the averaged depth along the XY direction of the fingertip is computed by projecting and accumulating depth values into the principle finger orientation. The averaged depth along the XY direction of the fingertip provides the fingertip centroid and may be computed according to Equations 6 and 7. $D_l$ computes the average depth value for pixels that is l-pixel away from the fingertip, where computes the overall number of pixels at distance l.

$$D_l = \frac{1}{N_l} \sum_{i, z_i > 0 : v_l^T x_i = l} z_i \qquad \text{Eq. 6}$$

$$N_l = \sum_{i, z_i > 0 : v_l^T x_i = l} 1 \qquad \text{Eq. 7}$$

Next, the slope angle of the fingertip in the depth direction, Z, can be computed using linear regression on the list (l, $D_l$) as shown in Equation 8. The linear regression produces the line y=a×l+b, wherein the slope of the line represents the finger inclination.

$$(a,b)=\mathrm{argmin}_{(a,b)} \Sigma_l (D_l - a \times l - b)^2 \qquad \text{Eq. 8}$$

Figure 5F:
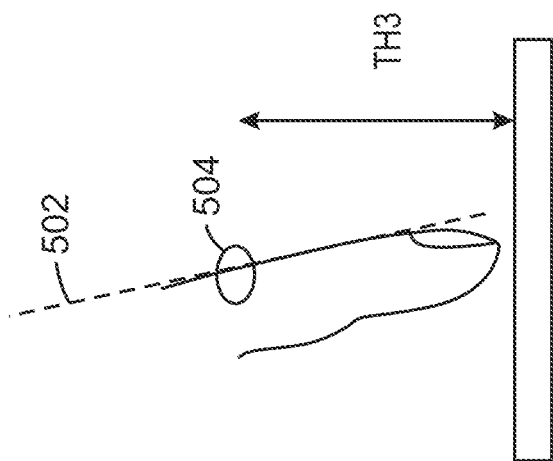
Figure 5E:
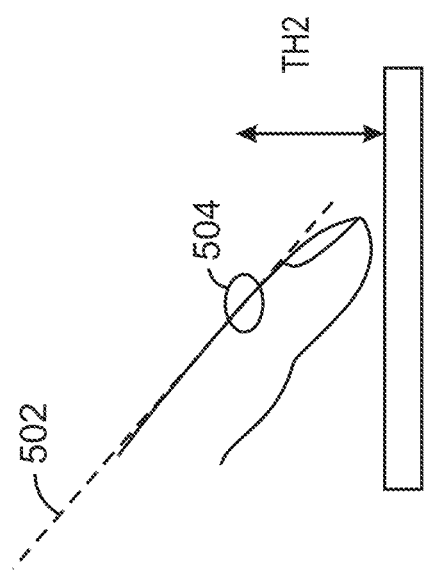
Figure 5D:
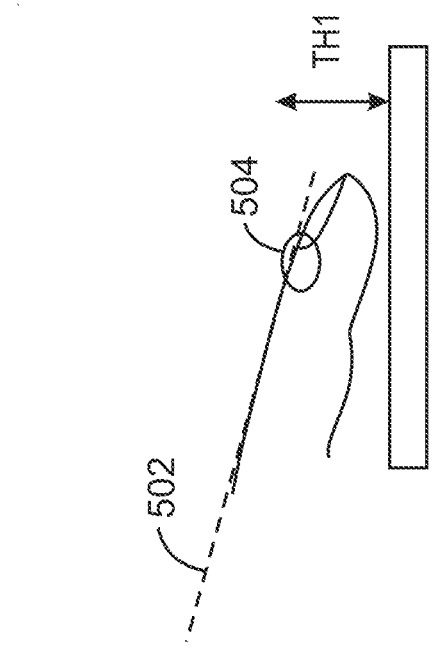

FIGS. 5D-F show examples of finger posture values that may be computed for a detected finger. FIG. 5D shows a relatively flat finger posture, FIG. 5E shows a normal finger posture, and FIG. 5F shows a steep finger posture. In each figure, the computed inclination is shown with line 502 and the fingertip centroid is shown as region 504.

At block 412, touch events are identified by determine whether the finger is touching the touch surface. For each detected finger and its associated estimated posture, the finger inclination information is used to select the distance threshold for detecting touch events. The distance between the fingertip centroid and the touch surface is compared to the selected distance threshold to determine whether the fingertip is touching the surface. For example, FIGS. 5D-F show a different threshold distance for each of three different finger inclinations. The threshold distances are labeled TH 1, TH 2, and TH3. As shown in FIGS. 5D-F, the threshold values are progressively relaxed from tight (TH 1) for flat fingers to loose TH 3 for steep fingers. Any suitable distance threshold values may be used. As an example, TH 1 may be equal to approximately 8 millimeters, TH 2 may be equal to approximately 18 millimeters, and TH 3 may be equal to approximately 25 millimeters. However, it will be appreciated that other distance thresholds may also be specified. Furthermore, the touch detection technique may also use a greater number of distance thresholds applicable for additional inclinations values between those shown in FIGS. 5D-F.

When the finger centroid falls below the distance threshold, a touch events is detected. Each of the centroids 504 shown in FIGS. 5D-F represent the centroid location for different finger postures when touch event would be detected.

At block 414, the touch point locations may be stabilized. To stabilize the touch points, the movement of the centroid location of each fingertip region is tracked from frame to frame. The centroid location tends to be more stable compared to the fingertip extremity location which tends to be very noisy due to the loss of depth accuracy when the finger is touching the surface. Therefore, the centroid location provides a more reliable indication of the finger movement between successive frames. For each fingertip centroid location, the distance in pixels by which the point has moved from the previous frame is computed. For very minor movements the previous fingertip centroid location is used for touch detection. For larger movements (the midpoint of the previous fingertip centroid location and the current fingertip centroid location is computed and used for touch detection. As an example, a minor movement may be considered to be a movement of less than 3 pixels, and a larger movement may be considered to be a movement of greater than 6 pixels. Other values for the degree of movement can also be specified.

At block 416, touch events are raised by injecting the detected touch events into the operating system. In some examples, the touch events are injected into the operating system through a user Interface device driver that complies with the Universal Serial Bus-Human Interface Device (USB-HID) class specification.

The method 400 should not be interpreted as meaning that the blocks are necessarily performed in the order shown. Furthermore, fewer or greater actions can be included in the method 400 depending on the design considerations of a particular implementation.

FIGS. 5A-F are example illustrations of a method of detecting touch events. FIGS. 5A-F are described further above in relation to FIG. 4.

EXAMPLES

Example 1 is a computing device with a virtual touch screen. The computing device includes a projector to project a user interface image onto a touch surface, a depth camera to generate a depth image representing objects in a vicinity of the user interface image, a touch mask generator to receive the depth image from the depth camera and generate a touch mask, and a touch detection module to analyze the touch mask to detect touch events. The touch detection module is configured to identify a finger in the touch mask, identify a centroid region of the finger and compute a distance of the centroid region from a touch surface, and compare the distance to a threshold distance to identify a touch event.

Example 2 includes the computing device of example 1, including or excluding optional features. In this example, the touch detection module is configured to determine an angle of the finger from the touch mask and adjust the threshold distance based on the angle.

Example 3 includes the computing device of any one of examples 1 to 2, including or excluding optional features. In this example, the touch detection module is configured to track movement of the centroid region of the finger between successive frames to stabilize a position of the centroid region.

Example 4 includes the computing device of any one of examples 1 to 3, including or excluding optional features. In this example, the touch detection module is configured to identify a hand in the touch mask and analyze a portion of the touch mask corresponding to the hand to identify the finger.

Example 5 includes the computing device of any one of examples 1 to 4, including or excluding optional features. In this example, to identify the hand, the touch detection module is configured to: generate a binary mask from the touch mask; identify a contour region corresponding to an object in the binary touch mask; compute a histogram of depth values within the contour region; and compare the histogram of depth values to a predetermined depth model for a typical hand object.

Example 6 includes the computing device of any one of examples 1 to 5, including or excluding optional features. In this example, to identify the finger, the touch detection module is configured to: identify the contour region as a corresponding to a hand; analyze the contour region to identify a potential fingertip based on contour angles of the contour region; determine a geometric feature of the potential fingertip from the touch mask; and compare the geometric feature to a model of a typical fingertip.

Example 7 includes the computing device of any one of examples 1 to 6, including or excluding optional features. In this example, to generate the touch mask, the touch mask generator is configured to implement a two-pass process for eliminating global noise variations and local noise variations from depth value data of the depth image received from the depth camera, wherein global noise variations are eliminated in a first pass of the two-pass process to generate a residual depth map, and local noise variations are eliminated in a second pass of the two-pass process.

Example 8 includes the computing device of any one of examples 1 to 7, including or excluding optional features. In this example, during the first pass, the touch mask generator is to: remove outliers from the depth value data of the depth image to generate outlier-removed depth data; perform a two-dimensional linear regression on the outlier-removed depth data in a central area of the depth image to generate a principle plane of the touch surface; and subtract the principle plane from the depth value data to generate the residual depth map.

Example 9 includes the computing device of any one of examples 1 to 8, including or excluding optional features. In this example, during the second pass, the touch mask generator is to: continuously update a Gaussian distribution at each pixel of the residual depth map across successive frames of the depth value data; compute an average pixel depth for each pixel based on the Gaussian distribution; and for each pixel, subtract the average pixel depth from a corresponding pixel of the residual depth map to generate normalized residual depth values. Optionally, during the second pass, the touch mask generator is to collect all normalized residual depth values with a standard deviation of two sigma away from the touch surface for inclusion within the touch mask.

Example 10 is a method of operating a virtual touch screen device. The method includes projecting a user interface image onto a touch surface; generating a depth image representing objects in a vicinity of the user interface image; generating a touch mask from the depth image; identifying a finger in the touch mask; identifying a centroid region of the finger and computing a distance of the centroid region from a touch surface; and comparing the distance to a threshold distance to identify a touch event.

Example 11 includes the method of example 10, including or excluding optional features. In this example, the method includes determining an angle of the finger from the touch mask and adjusting the threshold distance based on the angle.

Example 12 includes the method of any one of examples 10 to 11, including or excluding optional features. In this example, the method includes tracking movement of the centroid region of the finger between successive frames to stabilize a position of the centroid region.

Example 13 includes the method of any one of examples 10 to 12, including or excluding optional features. In this example, the method includes identifying a hand in the touch mask and analyzing a portion of the touch mask corresponding to the hand to identify the finger.

Example 14 includes the method of any one of examples 10 to 13, including or excluding optional features. In this example, identifying the hand comprises: generating a binary mask from the touch mask; identifying a contour region corresponding to an object in the binary touch mask; computing a histogram of depth values within the contour region; and comparing the histogram of depth values to a predetermined depth model for a typical hand object.

Example 15 includes the method of any one of examples 10 to 14, including or excluding optional features. In this example, identifying the finger comprises: identifying the contour region as a corresponding to a hand; analyzing the contour region to identify a potential fingertip based on contour angles of the contour region; determining a geometric feature of the potential fingertip from the touch mask; and comparing the geometric feature to a model of a typical fingertip.

Example 16 includes the method of any one of examples 10 to 15, including or excluding optional features. In this example, generating the touch mask comprises eliminating global noise variations to generate a residual depth map, and eliminating local noise variations from the residual depth map to generate the touch mask.

Example 17 includes the method of any one of examples 10 to 16, including or excluding optional features. In this example, eliminating global noise variations comprises: removing outliers from the depth image to generate outlier-removed depth data; performing a two-dimensional linear regression on the outlier-removed depth data in a central area of the depth image to generate a principle plane of the touch surface; and subtracting the principle plane from the depth image to generate the residual depth map.

Example 18 includes the method of any one of examples 10 to 17, including or excluding optional features. In this example, eliminating local noise variations comprises: continuously updating a Gaussian distribution at each pixel of the residual depth map across successive frames; computing an average pixel depth for each pixel based on the Gaussian distribution; and for each pixel, subtracting he average pixel depth from a corresponding pixel of the residual depth map to generate normalized residual depth values. Optionally, eliminating local noise variations comprises collecting all normalized residual depth values with a standard deviation of two sigma away from the touch surface for inclusion within the touch mask.

Example 19 is a tangible, non-transitory, computer-readable medium comprising instructions that, when executed by a processor, direct the processor to operate a virtual touch screen device. The computer-readable medium includes instructions that direct the processor to: project a user interface image onto a touch surface; generate a depth image that represents objects in a vicinity of the user interface image; generate a touch mask from the depth image; identify a finger in the touch mask; identify a centroid region of the finger and compute a distance of the centroid region from a touch surface; and compare the distance to a threshold distance to identify a touch event.

Example 20 includes the computer-readable medium of example 19, including or excluding optional features. In this example, the computer-readable medium includes instructions to direct the processor to determine an angle of the finger from the touch mask and adjust the threshold distance based on the angle.

Example 21 includes the computer-readable medium of any one of examples 19 to 20, including or excluding optional features. In this example, the computer-readable medium includes instructions to direct the processor to track movement of the centroid region of the finger between successive frames to stabilize a position of the centroid region.

Example 22 includes the computer-readable medium of any one of examples 19 to 21, including or excluding optional features. In this example, the computer-readable medium includes instructions to direct the processor to identify a hand in the touch mask and analyzing a portion of the touch mask corresponding to the hand to identify the finger.

Example 23 includes the computer-readable medium of any one of examples 19 to 22, including or excluding optional features. In this example, the instructions to direct the processor to identify the hand direct the processor to: generate a binary mask from the touch mask; identify a contour region corresponding to an object in the binary touch mask; compute a histogram of depth values within the contour region; and compare the histogram of depth values to a predetermined depth model for a typical hand object.

Example 24 includes the computer-readable medium of any one of examples 19 to 23, including or excluding optional features. In this example, the instructions to direct the processor to identify the finger direct the processor to: identify the contour region as a corresponding to a hand; analyze the contour region to identify a potential fingertip based on contour angles of the contour region; determine a geometric feature of the potential fingertip from the touch mask; and compare the geometric feature to a model of a typical fingertip.

Example 25 includes the computer-readable medium of any one of examples 19 to 24, including or excluding optional features. In this example, the instructions to direct the processor to generate the touch mask direct the processor to eliminate global noise variations to generate a residual depth map, and eliminate local noise variations from the residual depth map to generate the touch mask.

Example 26 includes the computer-readable medium of any one of examples 19 to 25, including or excluding optional features. In this example, the instructions to direct the processor to eliminate global noise variations direct the processor to: remove outliers from the depth image to generate outlier-removed depth data; perform a two-dimensional linear regression on the outlier-removed depth data in a central area of the depth image to generate a principle plane of the touch surface; and subtract the principle plane from the image to generate the residual depth map.

Example 27 includes the computer-readable medium of any one of examples 19 to 26, including or excluding optional features. In this example, the instructions to direct the processor to eliminate local noise variations direct the processor to: continuously update a Gaussian distribution at each pixel of the residual depth map across successive frames; compute an average pixel depth for each pixel based on the Gaussian distribution; and for each pixel, subtract he average pixel depth from a corresponding pixel of the residual depth map to generate normalized residual depth values. Optionally, the instructions to direct the processor to eliminate local noise variations direct the processor to collect all normalized residual depth values with a standard deviation of two sigma away from the touch surface for inclusion within the touch mask.

Example 28 is an apparatus. The apparatus includes means for projecting a user interface image onto a touch surface, means for generating a depth image representing objects in a vicinity of the user interface image, means for generating a touch mask based on the depth image, and means for analyzing the touch mask to detect touch events. The means for analyzing the touch mask is configured to: identify a finger in the touch mask, identify a centroid region of the finger and compute a distance of the centroid region from a touch surface, and compare the distance to a threshold distance to identify a touch event.

Example 29 includes the apparatus of example 28, including or excluding optional features. In this example, the means for analyzing the touch mask is configured to determine an angle of the finger from the touch mask and adjust the threshold distance based on the angle.

Example 30 includes the apparatus of any one of examples 28 to 29, including or excluding optional features. In this example, the means for analyzing the touch mask is configured to track movement of the centroid region of the finger between successive frames to stabilize a position of the centroid region.

Example 31 includes the apparatus of any one of examples 28 to 30, including or excluding optional features. In this example, the means for analyzing the touch mask is configured to identify a hand in the touch mask and analyze a portion of the touch mask corresponding to the hand to identify the finger.

Example 32 includes the apparatus of any one of examples 28 to 31, including or excluding optional features. In this example, to identify the hand, the means for analyzing the touch mask is configured to: generate a binary mask from the touch mask; identify a contour region corresponding to an object in the binary touch mask; compute a histogram of depth values within the contour region; and compare the histogram of depth values to a predetermined depth model for a typical hand object.

Example 33 includes the apparatus of any one of examples 28 to 32, including or excluding optional features. In this example, to identify the finger, the means for analyzing the touch mask is configured to: identify the contour region as a corresponding to a hand; analyze the contour region to identify a potential fingertip based on contour angles of the contour region; determine a geometric feature of the potential fingertip from the touch mask; and compare the geometric feature to a model of a typical fingertip.

Example 34 includes the apparatus of any one of examples 28 to 33, including or excluding optional features. In this example, the means for generating the touch mask is configured to implement a two-pass process for eliminating global noise variations and local noise variations from depth value data of the depth image received from the depth camera, wherein global noise variations are eliminated in a first pass of the two-pass process to generate a residual depth map, and local noise variations are eliminated in a second pass of the two-pass process.

Example 35 includes the apparatus of any one of examples 28 to 34, including or excluding optional features. In this example, during the first pass, the means for generating the touch mask is to: remove outliers from the depth value data of the depth image to generate outlier-removed depth data; perform a two-dimensional linear regression on the outlier-removed depth data in a central area of the depth image to generate a principle plane of the touch surface; and subtract the principle plane from the depth value data to generate the residual depth map.

Example 36 includes the apparatus of any one of examples 28 to 35, including or excluding optional features. In this example, during the second pass, the means for generating the touch mask is to: continuously update a Gaussian distribution at each pixel of the residual depth map across successive frames of the depth value data; compute an average pixel depth for each pixel based on the Gaussian distribution; and for each pixel, subtract the average pixel depth from a corresponding pixel of the residual depth map to generate normalized residual depth values. Optionally, during the second pass, the means for generating the touch mask to collect all normalized residual depth values with a standard deviation of two sigma away from the touch surface for inclusion within the touch mask.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device with a virtual touch screen, comprising:
    a projector to project a user interface image onto a touch surface;
    a depth camera to generate a depth image representing objects in a vicinity of the user interface image;
    a touch mask generator to receive the depth image from the depth camera and generate a touch mask; and
    a touch detection module to analyze the touch mask to detect touch events, wherein the touch detection module is configured to:
    generate a binary mask from the touch mask;
    identify a contour region corresponding to an object in the binary mask;
    compute a histogram of depth values within the contour region; and
    compare the histogram of depth values to a predetermined depth model for a typical hand object to identify a hand in the touch mask;
    analyze a portion of the touch mask corresponding to the hand to identify a finger in the touch mask;
    determine an angle of the finger from the touch mask and compute a threshold touch detection distance based on the angle;
    identify a centroid region of the finger and compute a distance of the centroid region from a touch surface; and
    compare the distance to the threshold touch detection distance to identify a touch event.

2. The computing device of claim 1, wherein the touch detection module is configured to track movement of the centroid region of the finger between successive frames to stabilize a position of the centroid region.

3. The computing device of claim 1, wherein to identify the finger, the touch detection module is configured to:
    identify the contour region as a corresponding to the hand;
    analyze the contour region to identify a potential fingertip based on contour angles of the contour region;
    determine a geometric feature of the potential fingertip from the touch mask; and
    compare the geometric feature to a model of a typical fingertip.

4. The computing device of claim 1, wherein to generate the touch mask, the touch mask generator is configured to implement a two-pass process for eliminating global noise variations and local noise variations from depth value data of the depth image received from the depth camera, wherein global noise variations are eliminated in a first pass of the two-pass process to generate a residual depth map, and local noise variations are eliminated in a second pass of the two-pass process.

5. The computing device of claim 4, wherein during the first pass, the touch mask generator is to:
    remove outliers from the depth value data of the depth image to generate outlier-removed depth data;
    perform a two-dimensional linear regression on the outlier-removed depth data in a central area of the depth image to generate a principle plane of the touch surface; and
    subtract the principle plane from the depth value data to generate the residual depth map.

6. The computing device of claim 4, wherein during the second pass, the touch mask generator is to:
    continuously update a Gaussian distribution at each pixel of the residual depth map across successive frames of the depth value data;
    compute an average pixel depth for each pixel based on the Gaussian distribution; and
    for each pixel, subtract the average pixel depth from a corresponding pixel of the residual depth map to generate normalized residual depth values.

7. The computing device of claim 6, wherein during the second pass, the touch mask generator is to collect all normalized residual depth values with a standard deviation of two sigma away from the touch surface for inclusion within the touch mask.

8. A method of operating a virtual touch screen device, comprising:

projecting a user interface image onto a touch surface;

generating a depth image representing objects in a vicinity of the user interface image;

generating a touch mask from the depth image, wherein generating the touch mask comprises eliminating global noise variations to generate a residual depth map, and eliminating local noise variations from the residual depth map to generate the touch mask;

identifying a finger in the touch mask;

determining an angle of the finger from the touch mask and computing a threshold touch detection distance based on the angle;

identifying a centroid region of the finger and computing a distance of the centroid region from a touch surface; and comparing the distance to the threshold touch detection distance to identify a touch event.

9. The method of claim 8, comprising tracking movement of the centroid region of the finger between successive frames to stabilize a position of the centroid region.

10. The method of claim 8, comprising identifying a hand in the touch mask and analyzing a portion of the touch mask corresponding to the hand to identify the finger.

11. The method of claim 10, wherein identifying the hand comprises:

generating a binary mask from the touch mask;

identifying a contour region corresponding to an object in the binary mask;

computing a histogram of depth values within the contour region; and comparing the histogram of depth values to a predetermined depth model for a typical hand object.

12. The method of claim 11, wherein identifying the finger comprises:

identifying the contour region as a corresponding to a hand;

analyzing the contour region to identify a potential fingertip based on contour angles of the contour region;

determining a geometric feature of the potential fingertip from the touch mask; and comparing the geometric feature to a model of a typical fingertip.

13. The method of claim 8, wherein eliminating global noise variations comprises:

removing outliers from the depth image to generate outlier-removed depth data;

performing a two-dimensional linear regression on the outlier-removed depth data in a central area of the depth image to generate a principle plane of the touch surface; and subtracting the principle plane from the depth image to generate the residual depth map.

14. The method of claim 8, wherein eliminating local noise variations comprises:

continuously updating a Gaussian distribution at each pixel of the residual depth map across successive frames;

computing an average pixel depth for each pixel based on the Gaussian distribution; and for each pixel, subtracting the average pixel depth from a corresponding pixel of the residual depth map to generate normalized residual depth values.

15. The method of claim 14, wherein eliminating local noise variations comprises collecting all normalized residual depth values with a standard deviation of two sigma away from the touch surface for inclusion within the touch mask.

16. A tangible, non-transitory, computer-readable medium comprising instructions that, when executed by a processor, direct the processor to operate a virtual touch screen device, the instructions to direct the processor to:

project a user interface image onto a touch surface;

generate a depth image that represents objects in a vicinity of the user interface image;

generate a touch mask from the depth image;

generate a binary mask from the touch mask;

identify a contour region corresponding to an object in the binary mask;

compute a histogram of depth values within the contour region;

compare the histogram of depth values to a predetermined depth model for a typical hand object to identify a hand in the touch mask;

analyze a portion of the touch mask corresponding to the hand to identify a finger in the touch mask;

determine an angle of the finger from the touch mask and compute a threshold touch detection distance based on the angle;

identify a centroid region of the finger and compute a distance of the centroid region from a touch surface; and compare the distance to the threshold touch detection distance to identify a touch event.

17. The computer-readable medium of claim 16, comprising instructions to direct the processor to track movement of the centroid region of the finger between successive frames to stabilize a position of the centroid region.

* * * * *